United States Patent
Newby et al.

(12)

(10) Patent No.: US 6,442,106 B1
(45) Date of Patent: Aug. 27, 2002

(54) CURFEW TIMER APPARATUS

(76) Inventors: Jimmy F. Newby, 508 Main St., Sheridan, IN (US) 46069; David W. Douglas, 230 Mill Farm Rd., Noblesville, IN (US) 46060

( * ) Notice: Subject to any disclaimer, the term of this patent is extended or adjusted under 35 U.S.C. 154(b) by 0 days.

(21) Appl. No.: 08/355,708

(22) Filed: Dec. 14, 1994

(51) Int. Cl.[7] .......... G04F 10/00; G04B 47/02; G08B 1/00; H04M 15/00
(52) U.S. Cl. .......... 368/4; 368/9; 368/10; 368/13; 340/309.15; 379/131
(58) Field of Search .......... 368/3–6, 9, 10, 368/13, 107–113; 340/309.4, 309.15; 379/110, 131, 140, 190, 192, 199

(56) References Cited

U.S. PATENT DOCUMENTS

| | | |
|---|---|---|
| 4,319,319 A | 3/1982 | Wygant |
| 4,392,017 A | 7/1983 | Torres |
| 4,405,839 A | 9/1983 | Groff |
| 4,480,154 A | 10/1984 | Klee |
| 4,712,019 A | 12/1987 | Nilssen |
| 4,720,821 A | 1/1988 | Ke |
| 4,924,499 A | 5/1990 | Serby |
| 4,956,825 A * | 9/1990 | Wilts et al. .......... 368/9 |
| 5,008,586 A | 4/1991 | Miyazaki et al. |
| 5,062,134 A | 10/1991 | Laird |
| 5,191,231 A | 3/1993 | Berry |
| 5,258,656 A | 11/1993 | Pawlick |
| 5,265,154 A | 11/1993 | Schotz |
| 5,283,546 A | 2/1994 | Scop et al. |
| 5,317,632 A | 5/1994 | Ellison |

\* cited by examiner

*Primary Examiner*—Vit Miska
(74) *Attorney, Agent, or Firm*—Barnes & Thornburg

(57) ABSTRACT

A curfew timer apparatus for selectively disconnecting a signal line from an appliance. The apparatus includes a base and a timer coupled to the base. The timer is preferably a seven day timer configured to disconnect the signal line from the appliance during said preselected time periods and prevent usage of the appliance. The apparatus also lockable cover coupled to the base to protect and reduce the likelihood of tampering with the switch, the timer, the coupling means, and the connecting means. The base includes a flange surrounding an outer periphery of the base. The flange is configured to extend below a bottom surface of the base to abut a wall surrounding the wall outlet to reduce further the tampering risk. The apparatus further includes a three way switch for selectively continuously disconnecting the signal line from the appliance, continuously connecting the signal line to the appliance, or connecting the signal line to the appliance through the timer.

7 Claims, 2 Drawing Sheets

CURFEW TIMER APPARATUS

BACKGROUND AND SUMMARY OF THE INVENTION

The present invention relates to a curfew timer apparatus. More particularly, the present invention relates to timer apparatus for selectively disconnecting a telephone, television, or other electrical appliance at predetermined times to control access to the telephone or television.

The curfew timer apparatus of the present invention is particularly useful for controlling the use of a telephone by children. Often, children have telephones in their own room or at a location in the house where parents find it difficult to monitor access to the phone constantly. Therefore, children may spend too much time talking on the phone after school or late at night. This can interrupt completion of homework and cause the children to be tired during the next day at school. It is therefore desirable to control the time that children are permitted to use the telephone.

The present invention advantageously selectively disconnects a telephone line from a telephone connected to the apparatus at preprogrammed times. The present invention permits an operator to program the preselected time periods during each day of the week into the apparatus to set the times during which the telephone is operable. This is particularly advantageous for controlling access of children to the telephone. On the weekend, for instance, the apparatus of the present invention may be programmed to activate the telephone for longer time periods. On school nights, however, the apparatus can be programmed to disconnect the phone line earlier in the evening.

The present invention is also useful for courtesy phones in lobbies of hotels or businesses. During business hours, the apparatus of the present invention can be programmed to provide normal phone service to the courtesy phones. After business hours, the apparatus can be programmed to disconnect the courtesy phones from the telephone line to prevent unauthorized or unsupervised use of the phones. The apparatus is also useful to disconnect other business phones after working hours to prevent access by unauthorized personnel or to open the phone line for computer modems and fax machines. Again, the seven-day timer feature is useful. For instance, a business phone can be activated during normal weekday working hours. The curfew timer can be programmed to disable the telephone on weekends and after normal business hours on weekdays.

Advantageously, the present invention includes a lockable and removable cover to reduce the likelihood of tampering with the apparatus. A base of the apparatus includes a flange surrounding an outer periphery of the base. The flange is configured to extend below a bottom surface of the base to abut a wall surrounding the wall outlet. The flange therefore blocks access to the wall outlet to reduce further the likelihood of tampering with the apparatus.

Another novel feature of the present invention is the provision of a three-way activation switch accessible from outside an interior region of the apparatus defined by the base and the cover. In a first position, the telephone, television or other appliance is continuously deactivated. In a second position, the telephone or appliance is continuously activated without using the internal timer of the apparatus. In a third position, the three-way switch connects the telephone or television signal line to the timer so that the telephone or television is activated only during the preprogrammed time periods.

Several devices are known for controlling activation times of telephones, televisions, or other electrical appliances. See, for example, U.S. Pat. Nos. 4,319,319; 4,392,017; 4,405,839; 4,480,154; 4,712,019; 4,720,821; 4,924,499; 5,062,134; 5,191,231; 5,258,656; 5,265,154; 5,283,546; and 5,317,632.

According to one aspect of the present invention, a curfew timer apparatus is provided for selectively disconnecting a telephone line from a telephone. The apparatus includes a base and a timer coupled to the base. The timer is configured to open and close a switch during preselected time periods during each day of at least a seven day time period to disconnect the telephone line from the telephone during said preselected time periods and prevent usage of the telephone. The apparatus also includes means for coupling the telephone line to a first terminal of the switch, means for connecting a second terminal of the switch to the telephone, and a removable and lockable cover coupled to the base to protect and reduce the likelihood of tampering with the switch, the timer, the coupling means, and the connecting means.

In the illustrated embodiment, the means for connecting the second terminal of the switch to the telephone includes a plug having an inlet coupled to the second terminal of the switch and an outlet for connecting the plug to a telephone cord of the telephone. The illustrated embodiment also includes a strain relief member coupled to the base. The strain relief member engages the telephone cord to reduce strain on the telephone cord.

According to another aspect of the present invention, a wall mounted curfew timer apparatus is provided for selectively disconnecting a signal line from an appliance. The apparatus includes a base having a central aperture therein. The base also includes a flange surrounding an outer periphery of the base. The flange is configured to extend below a bottom surface of the base. The apparatus also includes a removable, lockable cover coupled to the base to define a housing having an interior region, and means for mounting the base to a wall over a signal wall outlet so that the signal line enters the interior region of the housing through the aperture in the base and so that the flange of the base abuts the wall surrounding the wall outlet. The apparatus further includes a timer coupled to the base. The timer is configured to open and close a switch during preselected time periods to disconnect the signal line from the appliance during said preselected time periods and prevent usage of the appliance. The apparatus still further includes means located in the interior region of the housing for coupling the signal line to a first terminal of the switch of the timer, and means located in the interior region of the housing for coupling a second terminal of the switch of the timer to the appliance.

According to yet another aspect of the present invention, a curfew timer apparatus is provided for selectively disconnecting a signal line from an appliance. The apparatus includes a base, and a three way switch having a movable contact and first and second fixed contacts. The movable contact is movable between a first position in which the movable contact is spaced apart from both the first fixed contact and the second fixed contact to disconnect the signal line from the appliance, a second position in which the movable contact engages the first fixed contact, and a third position in which the movable contact engages the second fixed contact. The apparatus also includes means for coupling the signal line to the movable contact of the three way switch, means for coupling the first fixed contact of the three way switch to the appliance to connect the signal line to the appliance continuously when the movable contact is in the second position, and a timer coupled to the base. The timer is configured to open and close a switch at a preselected time to disconnect the signal line from the appliance during said preselected time periods. The apparatus further includes means for coupling the second fixed contact of the three way switch to a first terminal of the switch of the timer, and means for coupling a second terminal of the switch of the timer to the appliance to connect the signal line to the appliance through the timer when the movable contact is in the third position.

In the illustrated embodiment, the apparatus further includes a removable, lockable cover coupled to the base to define a housing having an interior region. Also in the illustrated embodiment, the three way switch includes an end portion formed to include a keyway for receiving a key to move the movable contact. The cover is formed to include an opening for receiving the end portion of the three way switch to provide access to the keyway from outside the interior region of the housing. The cover also includes marks to provide a visual indication of the position of the movable contact of the three way switch.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
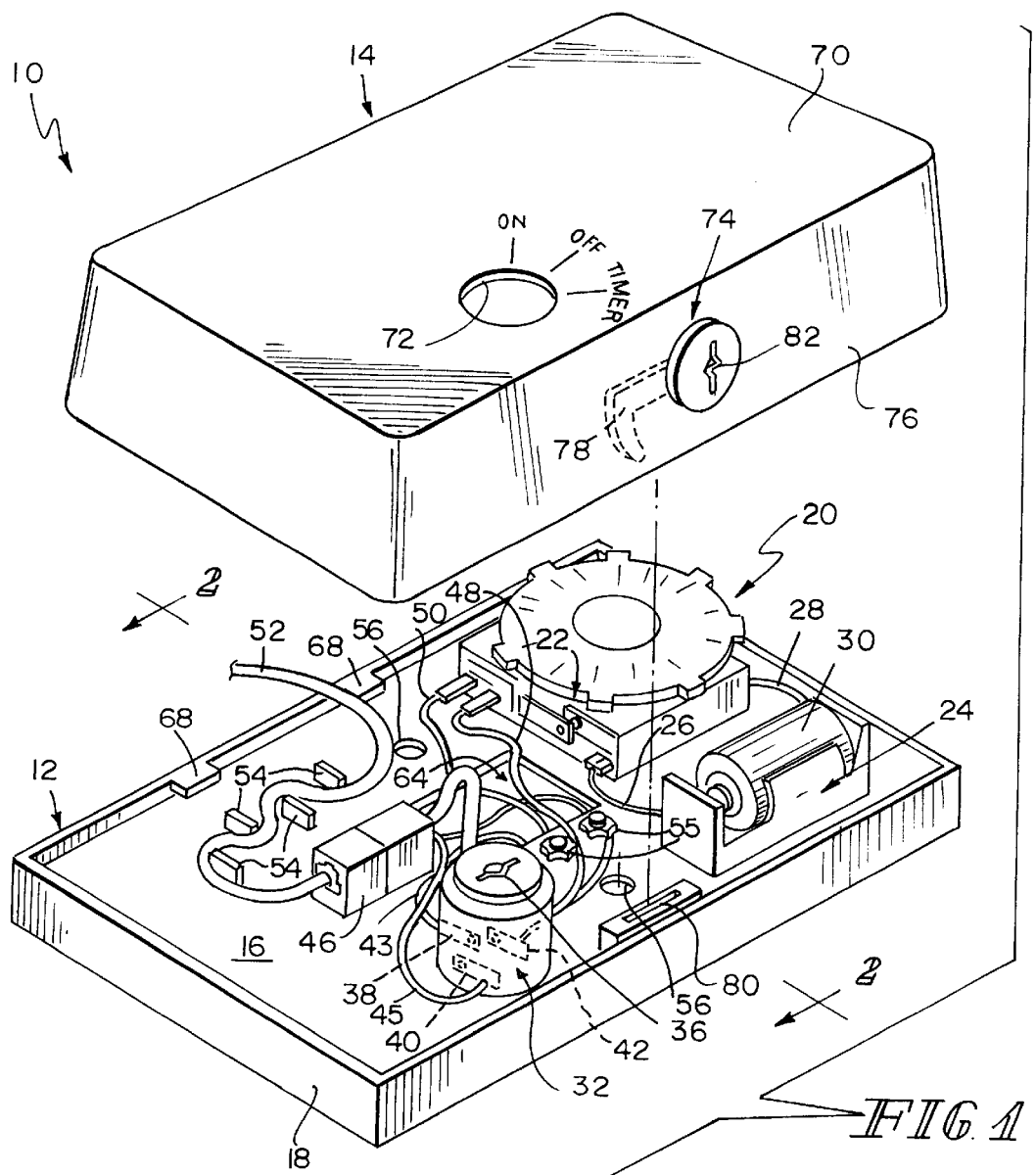
FIG. 1 is an exploded perspective view of the curfew timer apparatus of the present invention.

Referring now to the drawings, FIG. 1 illustrates a curfew timer apparatus 10 of the present invention. Curfew timer apparatus 10 includes a base portion 12 and a removable, lockable cover 14 to reduce the likelihood of tampering with the timer apparatus 10. Base 12 includes a support surface 16 and an outer flange 18 which extends both above and below the support surface 16. Curfew timer apparatus 10 preferably includes a programmable seven-day timer 20. Each of the seven days includes a programmable 24-hour time period for selectively opening and closing a switch 22 within timer 20. It is understood that a one-day timer may also be used, if desired.

Timer 20 is modified to operate under battery power. A battery holder 24 is secured to base support surface 16. Battery holder 24 is coupled to timer 20 by wires 26 and 28. Power is supplied to timer 20 by a standard C cell size battery 30. Illustratively, timer 20 is a series 882/1 seven-day timer available from Dieh. Alternately, a series 882 one-day timer available from Dieh may be used. These standard timers are quartz timers operated from a conventional wall outlet. However, in the preferred embodiment of the present invention the timer 20 is modified so that the wires 26 and 28 of battery holder 24 are coupled to terminals of a back-up power supply available within timer 20. This permits the single C cell battery 30 to operate timer 20 without connecting timer 20 to an electrical outlet. Illustratively, battery holder 24 is a model no. 270402 available from Radio Shack.

Figure 2:
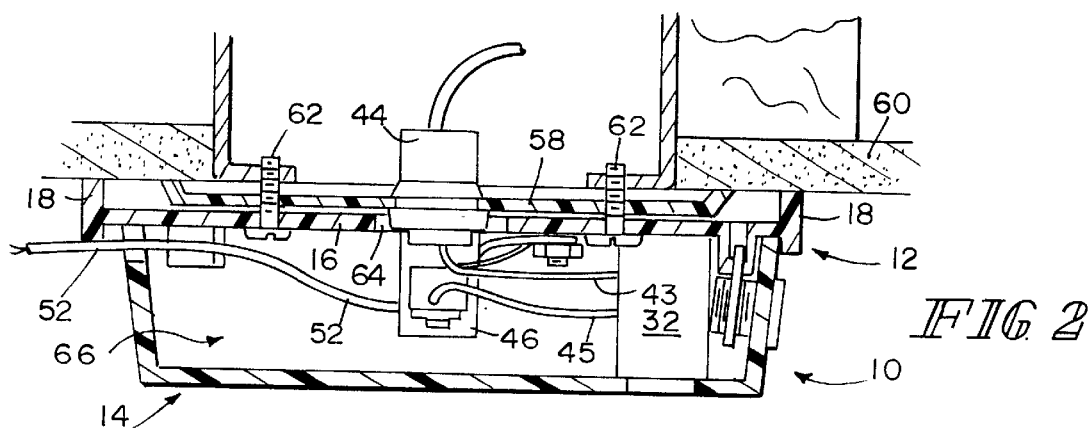
FIG. 2 is a sectional view taken along lines 2—2 illustrating additional details of the curfew timer apparatus coupled to a telephone outlet jack on a wall.
Figure 3:
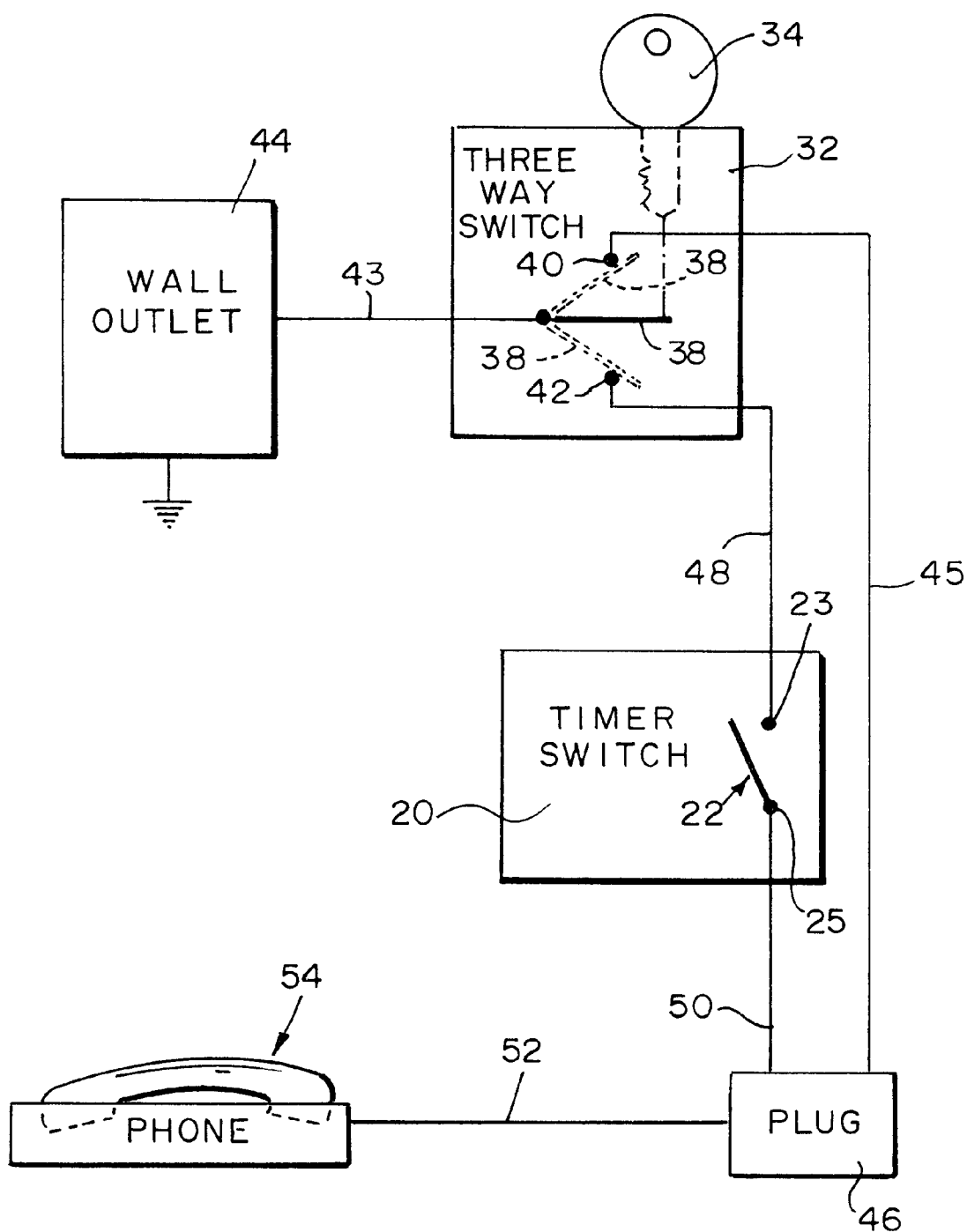
FIG. 3 is a diagrammatical view illustrating a schematic diagram of the wiring arrangement of the curfew timer apparatus.

The curfew timer apparatus 10 further includes a three-way switch 32 which is actuatable by a key 34 illustrated in FIG. 3 through key slot 36. Three-way switch 32 is illustrated diagrammatically in FIG. 1. Three-way switch includes a movable center contact 38, and first and second non-movable, fixed contacts 40 and 42. Center movable contact 38 is connected to a signal line 43 from a wall outlet telephone jack 44 as best illustrated in FIGS. 2 and 3. First fixed contact 40 is coupled to an inlet of a modular phone line coupling plug 46 by line 45. Phone line coupling plug 46 is illustratively a model TA68 available from Gemini Phone. Second fixed contact 42 is coupled to a first terminal 23 of timer 20 by line 48. A second terminal of timer 20 is coupled to an inlet plug 46 by line 50. An outlet of plug 46 is coupled to a telephone cord 52 which leads to a conventional telephone 54 illustrated in FIG. 3. Strain relief ribs 54 extend upwardly from support surface 16 of base 12 to provide stain relief for cord 52. Suitable ground terminals 55 are also coupled to base.

A pair of mounting apertures 56 are formed in support surface 16 of base 12 for mounting the curfew timer apparatus 10 to a wall 60 directly over a telephone outlet cover 58 with suitable fasteners 62. Advantageously, flange 18 extends below support surface 16 to abut the wall 60. Flange 18 fits over conventional bump outlets, wall receptacles, or wall mounted phone outlets. Flange 18 abutting wall 60 further reduces the likelihood of tampering with telephone jack 44 by blocking access to the outlet jack 44. A central opening 64 formed in support surface 16 provides a passageway for the wires from telephone jack 44 through support surface 16 and into an interior region 66 of the curfew timer apparatus 10 formed between support surface 16 and an interior surface of removable cover 14 as best illustrated in FIG. 2.

Base 12 includes a plurality of tabs 68 along one side for engaging a sidewall of cover 14 to secure one side of cover 14 to base 12. It is understood that other types of couplings may be used including a hinge. A top surface 70 of cover 74 is formed to include an opening 72 for receiving an end portion of three-way switch 32. This advantageously permits access to the keyway 36 of three-way switch 32 from outside interior region 66 of curfew timer apparatus 10. Preferably, top surface 70 of cover 14 includes marks or labels indicating the "on", "off" and "timer" positions for three-way switch 32 as discussed in detail below. A lock 74 is coupled to a sidewall 76 of cover 14. In the illustrated embodiment, lock 74 includes a rotatable hook member 78 configured to engage a locking member 80 formed on base 12 to secure cover 14 to base 12. Hook 78 is rotated from an open position illustrated in FIG. 1 to a locked position illustrated in FIG. 2 by key 34 positioned in keyway 82 of lock 74. It is understood that any conventional locking mechanism may be used to secure cover 14 to base 12 in order to reduce the likelihood of tampering with the curfew timer apparatus 10. Cover 14 and base 12 are integrally molded from plastic. Cover 14 is a solid piece so that a key 34 is required to access the timer 22 and other components within interior region 66 of the curfew timer apparatus 10. It is understood that other materials, such as metal may be used to manufacture base 12 and cover 14.

Operation of the curfew timer apparatus 10 is best illustrated in FIG. 3. As discussed above, signal line 43 from telephone wall outlet 44 is coupled to movable center contact 38 of three-way switch 32. Movement of movable contact 38 is controlled by key 34 inside keyway 36 of the three-way switch 32. When the solid line position of FIG. 3, the keyway is aligned with the "off" marking on top surface 70 of cover 14. This position of movable contact 38 continuously disconnects the phone line from phone 54 since moveable contact 38 does not contact either first fixed contact 40 or second fixed contact 42 in the "off" position. Also as discussed above, first fixed contact 40 is coupled to an inlet of phone line coupling plug 46 by line 45. An outlet of plug 46 is coupled to a conventional phone 54 by line 52. Therefore, when key 34 is used to move three-way switch to the "on" position in which movable contact 38 engages first fixed contact 40, the telephone 54 is continuously activated for normal use since wall outlet 44 is coupled to phone 54 though line 43, contacts 38 and 40, line 45, plug 46, and line 52.

Second fixed contact 42 is coupled to a first terminal 23 of switch 22 of timer 20. A second terminal 25 of switch 22 is coupled to an input of plug 46 by line 50. Therefore, when key 34 is actuated to move movable contact 38 against second fixed contact 42, the curfew timer apparatus 10 is its "timer" position. In other words, phone 54 is activated only when switch 22 of timer 20 is closed. Opening and closing of switch 22 is controlled by programming in preselected times during each day of the week for closing switch 22 to connect telephone 54 to the wall outlet jack 44. Three-way switch 32 therefore provides an additional control feature for an operator of the curfew timer apparatus 10. Operator can use key 34 to continuously disable telephone 54 by moving moveable contact to the "off" position. The operator can continuously enable telephone 54 by moving the movable contact 38 against first fixed contact 40 in the "on" position. Finally, the operator can use the pre-programmed timer 20 to control activation of the phone 54 by moving moveable contact 38 against second fixed contact 42 in the "timer" position. Therefore, curfew timer apparatus 10 is used to prevent phone usage during certain predetermined hours in a residential or commercial environment. The apparatus 10 is installed to restrict the use of one phone line without affecting any other phones that may be on the same line.

Although the preferred embodiment of the present invention has been described in detail with reference to controlling activation of a telephone 54, it is understood that the present invention can be used to control access to a television set in a similar manner. In this instance, the signal line to the television from a coax cable hookup or antenna can be coupled to a three-way switch 32 and timer 22 in a manner similar to the manner discussed above. The present invention can be used to disconnect selectively the signal to a television set without disconnecting a power supply to the television. Therefore, an internal memory within the television set can be maintained while still providing control over viewing times by children or employees.

Although the invention has been described in detail with reference to a certain preferred embodiment, variations and modifications exist within the scope and spirit of the present invention as described and defined in the following claims.

What is claimed is:

1. A curfew timer apparatus for selectively disconnecting a telephone line from a telephone, the apparatus comprising:
   a base;
   a timer coupled to the base, the timer being configured to open and close a switch during preselected time periods during each day of at least a seven day time period to disconnect the telephone line from the telephone during said preselected time periods and prevent usage of the telephone;
   means for coupling the telephone line to a first terminal of the switch;
   means for connecting a second terminal of the switch to the telephone;
   a removable and lockable cover coupled to the base to protect and reduce the likelihood of tampering with the switch, the timer, the coupling means, and the connecting means, further comprising means for mounting the base on a wall directly over a telephone wall outlet, and wherein the base includes a flange surrounding an outer periphery of the base, the flange being configured to extend below a bottom surface of the base to abut the wall surrounding the telephone wall outlet.

2. A wall mounted curfew timer apparatus for selectively disconnecting a signal line from a telephone, the apparatus comprising:
   a base having a central aperture therein, the base also including a flange surrounding an outer periphery of the base, the flange being configured to extend below a bottom surface of the base;
   a removable, lockable cover coupled to the base to define a housing having an interior region;
   means for mounting the base to a wall over a signal wall outlet so that the signal line enters the interior region of the housing through the aperture in the base and so that the flange abuts the wall surrounding the wall outlet;
   a timer coupled to the base, the timer being configured to open and close a switch during preselected time periods to disconnect the signal line from the telephone during said preselected time periods and prevent usage of the appliance;
   means located in the interior region of the housing for coupling the signal line to a first terminal of the switch of the timer; and
   means located in the interior region of the housing for coupling a second terminal of the switch of the timer to the telephone.

3. The apparatus of claim 2, wherein the timer is configured to open and close the switch during preselected time periods during each day of at least a seven day time period to disconnect the signal line from the telephone during said preselected time periods and prevent usage of the telephone.

4. The apparatus of claim 2, wherein the cover includes a lock having a rotatable hook member movable by a key to engage a locking member formed on the base to secure the cover to the base.

5. The apparatus of claim 2, further comprising a three way switch having a movable contact and first and second fixed contacts, the movable contact being movable between a first position in which the movable contact is spaced apart from both the first fixed contact and the second fixed contact to disconnect the signal line from the telephone, a second position in which the movable contact engages the first fixed contact, and a third position in which the movable contact engages the second fixed contact, means for coupling the signal line to the movable contact of the three way switch, means for coupling the first fixed contact of the three way switch to the telephone to connect the signal line to the telephone continuously when the movable contact is in the second position, means for coupling the second fixed contact of the three way switch to the first terminal of the switch of the timer to connect the signal line to the telephone through the timer when the movable contact is in the third position.

6. The apparatus of claim 5, wherein the three way switch includes an end portion formed to include a keyway for receiving a key to move the movable contact, and wherein the cover is formed to include an opening for receiving the end portion of the three way switch to provide access to the keyway from outside the interior region of the housing.

7. A curfew timer apparatus for selectively disconnecting a signal line from an appliance, the apparatus comprising:

a base;

a three way switch having a movable contact and first and second fixed contacts, the movable contact being movable between a first position in which the movable contact is spaced apart from both the fixed contact and the second fixed contact to disconnect the signal line from the appliance, a second position in which the movable contact engages the first fixed contact, and a third position in which the movable contact engages the second fixed contact;

means for coupling the signal line to the movable contact of the three way switch;

means for coupling the first fixed contact of the three way switch to the appliance to connect the signal line to the appliance continuously when the movable contact is in the second position;

a timer coupled to the base, the timer configured to open and close a switch at a preselected time to disconnect the signal line from the appliance during said preselected time periods;

means for coupling the second fixed contact of the three way switch to a first terminal of the switch of the timer;

means for coupling a second terminal of the switch of the timer to the appliance to connect the signal line to the appliance through the timer when the movable contact is in the third position; and further comprising means for mounting the base on a wall directly over a signal line wall outlet, and wherein the base includes a flange surrounding an outer periphery of the base, the flange being configured to extend below a bottom surface of the base abut the wall surrounding the wall outlet.

\* \* \* \* \*